(No Model.)
W. & W. B. MERRITT.
Machinery for Delivering Nails or Screws from the Feeding Chute.
No. 240,530. Patented April 26, 1881.
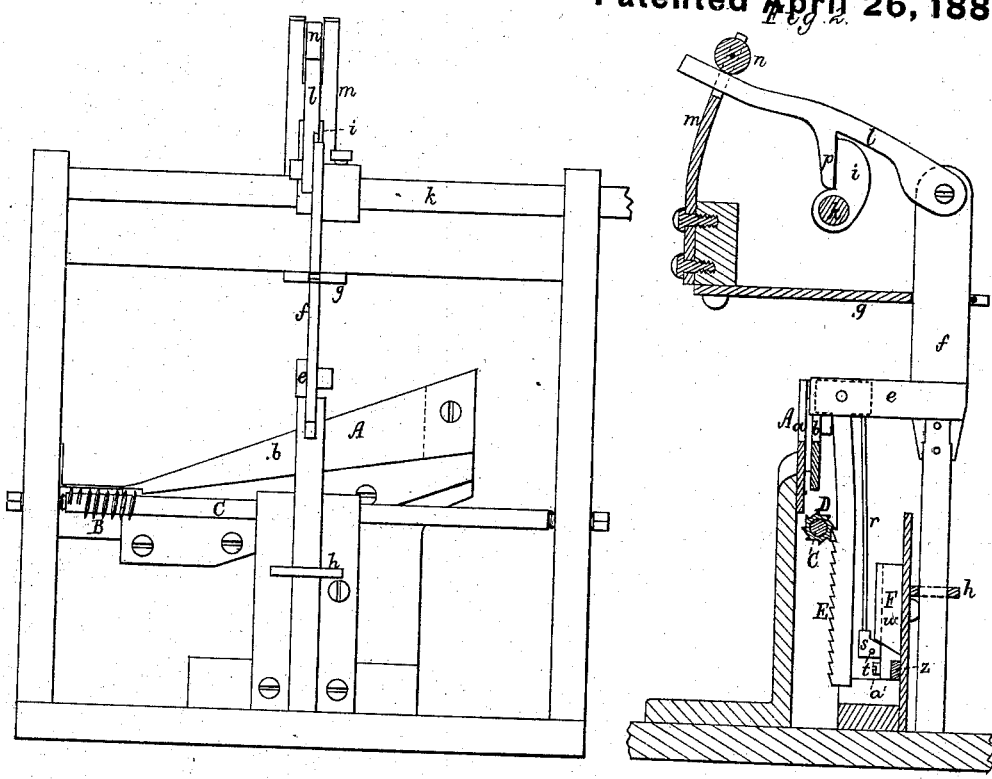
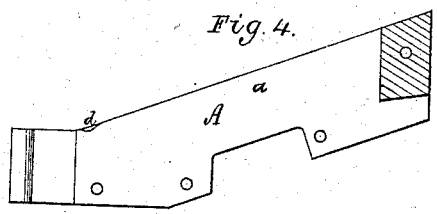
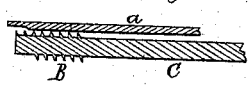
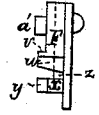
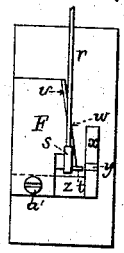
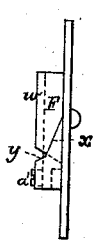
Witnesses.
S. N. Piper
Inventors.
Washington Merritt.
William B. Merritt
by R. H. Essex atty

UNITED STATES PATENT OFFICE.

WASHINGTON MERRITT AND WILLIAM B. MERRITT, OF WEYMOUTH, MASS.

MACHINERY FOR DELIVERING NAILS OR SCREWS FROM THE FEEDING-CHUTE.

SPECIFICATION forming part of Letters Patent No. 240,530, dated April 26, 1881.

Application filed February 7, 1881. (No model.)

*To all whom it may concern:*

Be it known that we, WASHINGTON MERRITT and WILLIAM B. MERRITT, of Weymouth, of the county of Norfolk and State of Massachusetts, have invented a new and useful Improvement in Machinery for Successively Delivering Nails or Screw - Blanks from the Feeding Chute or Ways of a Machine; and we do hereby declare the same to be described in the following specification and represented in the accompanying drawings, of which—

Figure 1 is a front elevation, and Fig. 2 a transverse section, of a nail chute or feeder with my invention applied thereto; Fig. 3 is a top view, and Fig. 4 a longitudinal section, and Fig. 5 a horizontal section, of the feeder and its delivering-screw; Fig. 6 is a top view, Fig. 7 a back view, and Fig. 8 a front side elevation, of the mechanism for engaging the screw-operative rack with and disengaging it from the pinion of the shaft of the delivery-screw.

The nature of our invention is fully set forth in the claims hereinafter made.

In the drawings, A denotes a nail chute or feeder as used in machinery for nailing shoes, it being composed of two inclined and parallel ways or rails, $a\ b$, arranged apart a distance a little greater than the diameter of each nail to be fed, the nails while in the chute being supported by their heads resting on the upper edges of the rails thereof. At its foot the chute or feeder receives a horizontal screw, B, which we term the "delivery-screw." Such screw extends within the feeder in a manner for the thread of the screw to project between the nails, the screw being against the sides of the nails. Near the rear end of the screw, or at the foot of the declivity of the feeder, such feeder has in its rails a countersink or socket, $d$, to receive each nail-head as it may reach the lower terminus of the declivity, such socket being to stop the nail in position for its proper reception between the turns of the screw-thread.

The delivery-screw is fixed on a horizontal shaft, C, carrying a gear or pinion, D, to be operated or intermittently revolved by a rack, E, provided with mechanism for moving it up or down and alternately throwing it into and out of engagement with the gear or pinion D. The rack at its upper part is suspended from an arm, $e$, extending from a vertical slide-bar, $f$, duly supported in suitable stationary guides $g\ h$. A cam, $i$, fixed on a horizontal shaft, $k$, arranged as shown, works against the tooth $p$ of an arm, $l$, jointed to the slide-bar $f$, at its upper part, such arm being extended through a standard, $m$, and against a friction-roller, $n$, arranged therein, as represented. On revolving the shaft $k$ the slide will be intermittently raised, and after each rise of it will fall by its weight.

There is fixed to and projecting down from the head of the rack a spring, $r$, provided at its lower end with a foot, $s$, having a stud, $t$, projecting from its front side. This foot is to operate with a vertical plate, F, provided on its inner side with a rib having two inclined faces, $v\ w$, arranged as represented. The spring, by its elastic force, is to move the foot in planes parallel to and at a right angle to the feeder. While the rack is being drawn upward the foot of the spring will be borne against the inclined face $v$ of the rib and also against the vertical inner side of the plate F, in which case the rack will, by the elastic force of the spring, be kept in engagement with the pinion, and of course will revolve it, and cause it to turn its shaft, whereby the delivery-screw will be revolved to advance the nails that may extend into it. On the foot $s$ and its stud $t$ passing above the rib, said foot, by the vibrating force of the spring, will be carried over the rib, the rack will be disengaged from the pinion, and, with the slide-bar, will fall downward, the spring and its foot being carried down at the same time. The foot in going down bears against the face $w$ of the rib, and on the stud $t$ passing down the inclined planes $x\ y$ the foot will be moved in a direction toward the pinion, and sufficient force will be generated in the spring to throw the rack into engagement with the pinion, and the elastic force which was also imparted to the spring while the foot was passing down the face $w$ will restore said foot to the proper position under the rib for a repetition of the above-described operation.

The inclined planes $x\ y$ are sustained in position by a bar, $z$, which projects from them into a groove in the bottom of the plate F, and is secured therein by a screw, $a'$. Thus it will be seen that an intermittent rotary motion will be imparted to the screw, so as to cause it, during each rotary movement of it, to advance the nails, and force one of them out of the delivery end of the feeder. Each nail so delivered from the feeder may be supposed to be driven by suitable means into a shoe.

In some cases it may be desirable to have the pinion-shaft continuously instead of intermittently revolved; but, generally speaking, it will be necessary to intermittently revolve it.

We claim as our invention as follows:

1. The nail chute or feeder provided with the nail-head-receiving countersink or socket, in combination with the delivery-screw applied to such chute and to operate therewith, substantially as set forth.

2. The combination for imparting to the feeding-screw an intermittent rotary movement, such combination consisting of the shaft C, pinion D, rack E, arm or slide-bar $f$, cam $i$, shaft $k$, tooth $p$, arm $l$, standard $m$, spring $r$, foot $s$, stud $d$, plate F, rib with inclined face $v\ w$, inclined planes $x\ y$, and bars $e$, all being arranged and to operate substantially as set forth.

WASHINGTON MERRITT.
WILLIAM B. MERRITT.

Witnesses:
R. H. EDDY,
E. B. PRATT.